July 5, 1960     E. D. HAIGLER     2,943,489
PRESSURE OR TEMPERATURE RESPONSIVE MECHANISM
Filed Sept. 8, 1953                              2 Sheets-Sheet 1
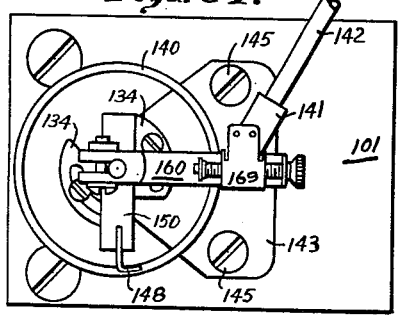
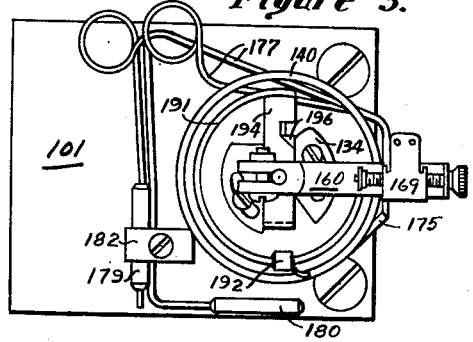
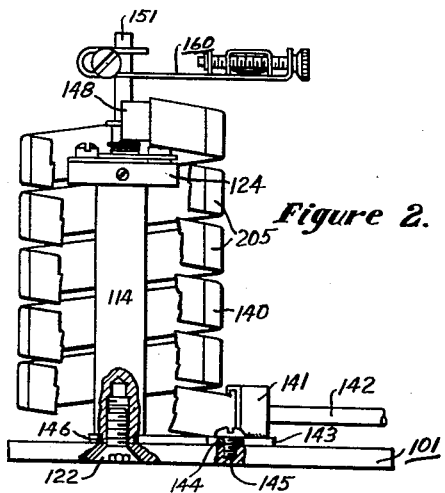
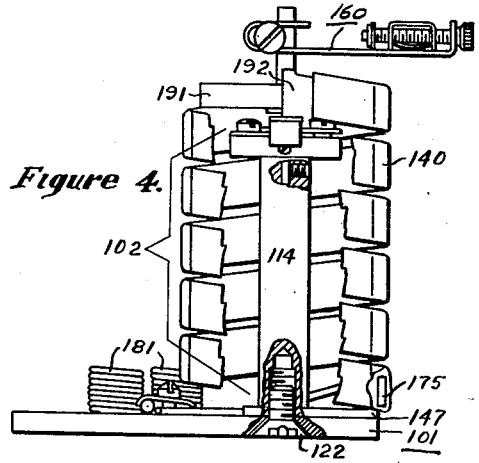
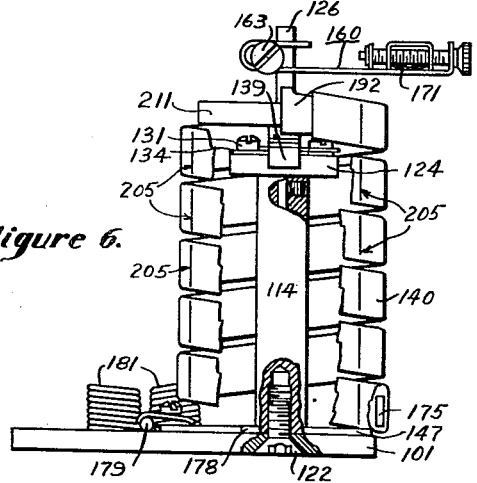
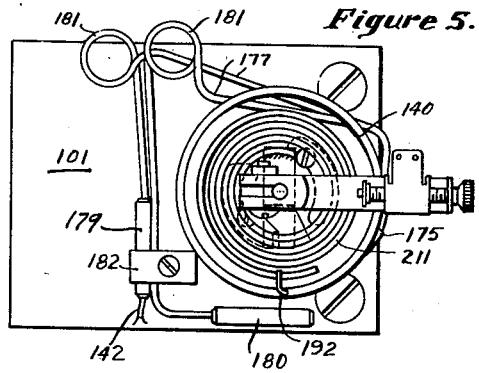
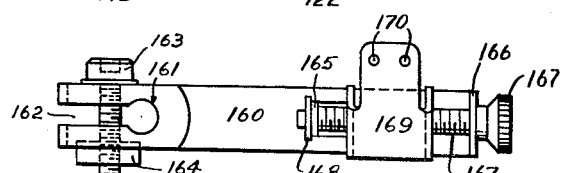
INVENTOR.
EDMUND D. HAIGLER.
BY
*Leonard L. Kalish*
ATTORNEY.

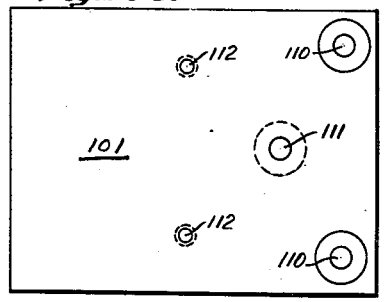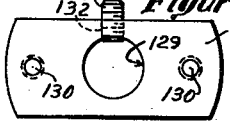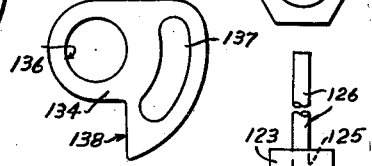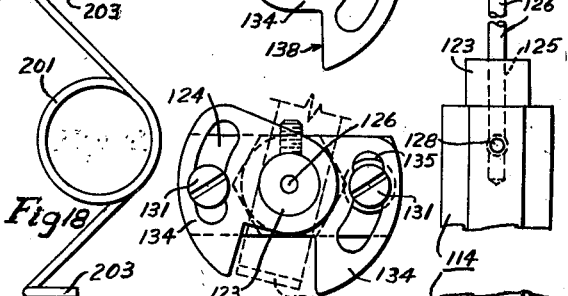

United States Patent Office 2,943,489
Patented July 5, 1960

2,943,489

PRESSURE OR TEMPERATURE RESPONSIVE MECHANISM

Edmund D. Haigler, Hatboro, Pa., assignor to Fischer & Porter Company, Hatboro, Pa., a corporation of Pennsylvania Filed Sept. 8, 1953, Ser. No. 378,943

13 Claims. (Cl. 73—418)

The present invention relates to a pressure or temperature responsive mechanism.

It is a purpose of this invention to provide an improved mechanical mounting for helical or spiral Bourdon elements, with a true single bearing construction avoiding problems of accurate angular alignment.

It is the further object of the present invention to provide a mounting having simple lateral centering of the Bourdon spring in two independent planes.

It is a further object of this invention to provide a mounting which can be produced economically.

It is a further object of this invention to provide stops of extreme rigidity in up-scale and/or down-scale direction for both clockwise and counterclockwise rotation elements.

It is a further object of this invention to provide an optional output lever stop which allows continued turning of the measuring element.

It is a further object of this invention to provide this mounting, without important change of parts for assembly without compensator or with short-range compensator or with limited-range compensator, as may be required on some temperature elements and on occasional suppressed-range pressure elements, and with long-range multi-turn compensators as may be required on other temperature elements.

For the purpose of illustrating the present invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the typical constructions described in the specification and shown in the drawings like reference numerals indicate like parts.

Figure 1 represents a top plan view of a mechanism which is one embodiment of the present invention, namely, the embodiment in which rigid stops are provided for the indicating end of the helical pressure element.

Figure 2 represents a side elevational view of the same, partly in section.

In mounting the mechanisms of the present invention in an instrument case, they are frequently mounted with the axis of the instrument disposed horizontally. In such mounting, the view shown in Figure 2 would of course be a plan view and the view shown in Figure 1 would be an elevational view. However, for consistency and simplicity in nomenclature, Figure 1 and other figures similarly disposed will be regarded as plan views, while Figure 2 and other figures similarly disposed will be regarded as elevational views.

Figure 3 represents a top plan view of a mechanism which is another embodiment of the present invention, namely, that embodiment which includes a short bimetal compensator, approximately three-quarter turn long, connected at one-half turn, and over-travel stop.

Figure 4 represents a side elevational view of the same.

Figure 5 represents a top plan view of a mechanism representing another embodiment of the present invention, similar to that shown in Figure 3 and 4, but with the long bimetal compensator, namely, approximately two-and-one-half turns, active.

Figure 6 represents a side elevational view of the same, partly in section.

Figure 7 represents an enlarged plan view of the output lever of the mechanisms of the present invention, showing both the angle adjustment and radial-adjustment means thereof.

Figure 8 represents a plan view of a base.

Figure 9 represents a plan view of a mounting post.

Figure 10 represents a side view of the post of Figure 9.

Figure 11 represents a double-scale plan of a stop sector support.

Figure 12 represents a double-scale plan view of a stop sector.

Figure 13 represents a plan view of a post assembly including parts of Figures 9–12.

Figure 14 represents a side elevation of an output bearing and stop lever assembly for units with no overrange stops or with positive stop or stops.

Figure 15 represents a side elevation of an output bearing and overtravel stop assembly.

Figure 16 represents a plan view of a spring lever used in the assembly of Figure 15.

Figure 17 represents a plan view of a stop lever used in the assembly of Figure 15.

Figure 18 represents a quadruple-scale plan view of the spring used in the assemblies of Figures 15 and 20, in its actual working rather than its free portion.

Figure 19 represents a quadruple-scale side elevation of the same, showing the form of the lever contacting loops.

Figure 20 represents a side elevation of the assembly of Figure 15, modified for connecting a long compensator above and inside the standard stop and spring mechanism.

Figure 21 represents a plan view of a helical Bourdon spring as used in Figures 3 and 4.

Figure 22 represents a vertical section of the same, on line 22—22 of Figure 21 showing the slot fitting over the spring lever in Figures 14, 15 and 20.

Figure 23 represents a plan view of a similar spring with spring tip for compensator connection.

Figure 24 represents a partial section of the same on line 24—24 of Figure 23.

The pressure responsive mechanism of this present invention includes a base 101, a bearing-post and over-travel-stop assembly 102, a Bourdon-spring assembly 103, an output-bearing assembly 104, and an output-lever assembly 105. The base 101 is a brass or aluminum plat containing two countersunk corner holes 110 for mounting the mechanism in an instrument-case, a hole 111, countersunk from the rear, for mounting post 114, and two small tapped holes 112 for the Bourdon-anchorage plate 143.

The post-and-stop assembly 102 includes a post 114 (preferably hexagonal in cross-section) having an axial tapped hole 121 in its lower end, to receive the mounting-screw 122 which extends through the hole 111 in the base 101, thereby rigidly to fasten the post 114 to the base 101. At its upper end, the post 114 is provided with a reduced-diameter cylindrical portion 123 for receiving the stationary over-travel stop-support 124 (shown separately in Figure 11); the central opening 129 of the support 124 being fitted over the cylindrical portion 123 of the post 114. The stop-support 124 is rigidly fastened in place either by soldering (or press-fitting) or by a set-screw 133 extending through the radial tapped hole 132 in the side of the stop-support 124, whereby said support may be adjustably secured to the top of the post 114. A small axial hole 125 is extended into the upper end of the post 114, for receiving the bearing-pin 126, which may be either press-fitted thereinto or otherwise rigidly secured therein, or which may be detachably held in place in the hole 125 by a set-screw 128 threaded into the radial tapped hole 127 in the side of the post 114. Bearing-pins 126 of ordinary hard-drawn stainless-steel have been found satisfactory, but 17–4PH hardenable steel also may be used.

The over-travel stop-support 124 is also provided with two tapped holes 130, to receive the clamping-screws 131, each of which screws serves to clamp in place (in its adjusted or selected "set" position) one of the two similar over-travel stop-members 134.

Each of the stop-members 134 is provided with an opening 136 which fits over the cylindrical portion 123 of the post 114, and with an elongated arcuate opening 137 through which a clamping screw 131 extends (as indicated in Figure 13) and with a stop-edge 138.

Either one of two stop-members 134 may be used, according to whether the over-travel of the output-arm 160 is to be limited or stopped in one direction or in both directions. When two stop-members 134 are used, one above the other, as shown for instance in Figure 13, then a spacer-washer 135 is placed beneath the higher of the two stop-members 134, namely, between it and the support 124 (being placed on the corresponding screw 131), so as to prevent the screw 131 from bending the higher stop-member 134 when clamped in its "set" position.

The Bourdon-spring assembly 103 includes the coil or helix 140 of a flat Bourdon-tube, of a suitable number of turns as, for instance, five turns. The tube 140 is preferably of Bourdon-tubing of relatively flat or oblong cross-section approximately ⅜ of an inch wide, more or less. In the embodiment shown in Figures 1 and 2, the lower of "fixed" end of the flat Bourdon spring tube is inserted into and soldered in place in a correspondingly shaped tube-receiving hole or slot in the connection-block 141, into the other end of which the pressure-connection tube or capillary tube 142 is extended and similarly soldered in place, to form the fluid connection between the Bourdon-tube 140 and the conventional bulb (not shown) at the point of measurement which contains the predetermined amount of expansive fluid.

The block 141 also serves as a fixed anchorage for the lower end of the Bourdon tube 140.

The block 141 may be soldered, brazed or otherwise affixed to the triangular adjustable anchorage plate 143, which constitutes a Bourdon-anchorage member. The Bourdon-plate 143 is provided with an untapped hole 146 at its inner apex, which hole is over-size for the stem of the screw 122, and is also provided with a pair of over-size untapped holes 144 near its outer apices, to receive the stems of the anchorage screws 145, which screws thread into the tapped holes 112 in the base-plate 101 of the mechanism.

The Bourdon-anchoring plate or sub-base 143 is anchored or affixed to the main base 101 by having its inner end fastened between the lower end of the post 114, and the base 101, by the screw 122, and by having its outer end fastened by the screws 145 threaded into the tapped holes 112 of the base 101.

The clearance between the hole 146 and the stem of the screw 122, and the clearances between the holes 144 and the stems of the screws 145, are such that whole Bourdon-spring assembly 103 may be laterally adjusted, so as to bring its upper end of the tube 140 into proper alignment with the lever 150 and with the axis of the bearing-pin 126.

The upper end of the Bourdon-tube-spring 140 is provided with a tip 148 (Figures 1, 2, 21 and 22), which is provided with a horizontal slot 149, as shown in Figure 22, which is adapted to receive the horizontal end of the lever 150 (or the end of the lever 194) and to be affixed thereto by soldering; the L-shaped tip 148 being extended into the upper end of the Bourdon tube and soldered or otherwise fused in place, also to serve as a closure therefor.

The output bearing assembly 104 (Figures 14, 15 and 20) includes the elongated tubular output-bearing member 151, the inner bore 153 of which is slightly larger than the diameter bearing-pin 126 (Figure 10), except for the lowermost end of said bore, namely, the short portion 154, where the bore fits the pin 126 with a neat running fit.

The outer diameter of the tubular output-bearing member 151 is enlarged at its lower end as shown, for instance, in Figure 14, and is there provided with two flanges 202 flanking the enlarged portion thereof.

In the embodiment shown in Figures 1 and 2, the lever 150 is united with the output-bearing member 151 in the manner shown in Figure 14, by telescoping the hole in the lever 150 over the tubular bearing member 151 until the lever 150 bears against the upper flange 202. The lever 150 is then soldered or brazed in place, to be rigid and immovable in relation to the output-bearing member 151.

The adjustable output-lever assembly 105, shown particularly in Figure 7, but also shown in Figures 1 to 6, inclusive, includes a flat sheet-metal arm 160, one end of which is bent back upon itself as seen particularly in Figures 2, 4 and 6, to form a generally U-shaped end. Through the two legs of this U-shaped end, aligned holes 161 are extended, of a diameter just slightly larger than the outer diameter of the tubular output-bearing member 151, over which these holes are intended to be telescoped, when mounting the output-lever assembly 105 on the output-bearing member 151. The U-shaped end is provided with a slot 162. A clamping screw 163 is extended through the bend of the U, at the end of the lever 160, and with the nut 164 thereon pulls together the two halves of the U (on the opposite sides of the slot 162) and thereby firmly to tighten the holes 161 onto the outer surface or outer diameter of the tubular output-bearing member 151.

At the outer end of the lever 160, two ears 165 and 166 are turned upwardly from its body. A micrometer-adjustment screw 167, having an outer knurled head, is inserted into horizontally aligned bearing-holes in the ears 165 and 166, and is retained in place therein by a snap-ring 168. A U-shaped slider 169 having alternate pivot-holes 170 for receiving the pivot-pin of any suitable connecting-link (not shown) rides on and is threadedly engaged by the screw 167, so as to operate along said screw when the screw is turned. A bowed spring 171 (or other suitable means) may be interposed between the slider 169 and the arm 160, for taking up any back-lash or slack between the slider 169, the screw 167 and the lever-arm 160 and also for providing frictional resistance to any unintended change of position of slider 169 upon the arm 160.

In one embodiment of the present invention, illustrated particularly in Figures 1, 2, and 14, the tip 148 is connected (soldered) directly to the lever 150, which in turn is soldered or brazed to the output-bearing member 151. In this embodiment the stop-finger 172 extending, at a right angle, from the lever 150, is disposed between the two stop-edges 138 of the adjustable stop-members 134, if two such members are used, or is juxtaposed to one such stop-edge 138 when a "stop" is desired only in one direction. In this embodiment a rigid stop is thus provided against over-travel. However, as the turning force of the Bourdon-tube is applied to the lever 150 at a point very close to the close-fitting bearing portion 154 of the output-bearing 151, such rigid stop is feasible, within limits, without harm to the mechanism.

In the embodiment shown in Figures 3 and 4 and in Figures 15, 16, 17 and 18 (and including Figures 11 to 13, inclusive) the tip 148 of the Bourdon-tube spring 140 (instead of being fastened to the lever 150 and through it directly to the output-bearing member 151) is fastened to the driving lever 194. The hole 195 of the lever 194 is journalled on the outer diameter of the tubular output-bearing member 151. In this embodiment, the driven lever 196 (Figures 17 and 15), having a stop-finger 172 (similar to the stop-finger 172 of the lever 150) is permanently fastened to the output-bearing member 151, against the upper flanges 202 of said bearing member (Figure 15). The driving lever 194 is superimposed upon the driven lever 196, as shown particularly in Figure 15, and is held thereon by a spring-clip type retainer ring 197. To one end of the driving lever 194, the tube-tip 148 is soldered, as indicated in Figure 16. The driven lever 196 is also provided with an upturned coupling finger 139, which is generally at the same radius from the axis of the bearing member 151 as the recess 199 in the driving lever 194. The coupling finger 139 engages in the recess 199 at all times while the stop finger is free to move, and through the coupling-finger 139 the driving lever 194 drives or turns the driven lever 196 at all times except when the stop-finger 172 has come up against one of the stop-edges 138. Then the driving lever 194 continues to revolve by itself, leaving behind the driven lever 196, with its stop-finger 172 resting against the stop-edge 138.

A coiled spring 201 (Figures 18 and 19), with suitable number of convolutions around the enlarged lower portion of the tubular output-bearing member 151, intermediate the two flanges 202 thereof (Figures 15 and 20), and having two hook-ended arms 203, is arranged with one of its arms 203 bearing against the leading edge portion of the driving lever 194, as indicated in Figure 16, and with the other arm 203 thereof bearing against the trailing edge portion of the driven lever 196, as indicated in Figure 17; thereby forming a resilient connection between the levers 194 and 196 tending to keep the coupling finger 139 against the innermost edge of the recess 199 of the driving lever 194.

Thus, when the stop-finger 172 of the driven lever 196 (Figures 17, 15, 3 and 4) comes up against the stop-edge 138 of the stop-member 134, the output-bearing member 151 and the output-arm assembly 165 (Figures 4 and 7) ceases to rotate further, and, instead merely the driving lever 194 continues to rotate under the influence of the continued travel of the Bourdon-tube 140; flexing the spring 201 in such further travel of the driving lever 194.

In the embodiment shown in Figures 5, 6, 20, 23 and 24, a multi-turn spiral bimetal temperature-compensator 211 is interposed between the upper Bourdon-tip 192 and the driving lever 194. The compensator 211 is a flat coil of bimetal. Any suitable number of turns are provided, as, for instance, to two-and-one-half or three active turns. As the temperature-compensator 211 cannot be conveniently enlarged so that its inner diameter will clear levers 194 and 196, an off-setting arm 212 is fastened (by soldering or otherwise) to the driving lever 194, as shown particularly in Figure 20, and it is to the offset end 213 of this arm 212, that the inner end of the coiled temperature-compensator 211 is secured (by soldering or the like); while to the outer end of this compensator the tip 192 (Figures 23 and 24) of the Bourdon-tube 140 is secured.

In this embodiment (Figures 5, 6 and 20) the height of the post 114 is reduced just sufficiently to make up for the off-setting of the arm 212, so that the end 213 of the arm 212, which receives the Bourdon tip 192 will be at the same height as the lever 150 in the form of construction shown in Figures 1, 2 and 14, or as the lever 194 in the form of construction shown in Figures 3, 4 and 15.

By this means, temperature changes at the point at which the instrument is located or in the zone through which the tube 142 passes, is compensated for, so that the instrument may reflect the temperature at the point of measurement; uninfluenced by such temperature-changes.

Where a lesser temperature-compensation is sufficient, a short bimetal compensator 191, as indicated in Figures 3 and 4, may be used intermediate of the tip 192 of the Bourdon-tube 140 and the driving lever 194 (or intermediate the tip 192 and the lever 150). In the use of such a short compensator element, as 191, no off-setting arm 212 is necessary.

When it is desired to use either the short compensator 191, as in the embodiment shown in Figures 3 and 4, or the long compensator 211, as in the embodiment shown in Figures 5 and 6, the upper tip or motion-transmitting end of the Bourdon tube 140 may be of the form shown in Figures 23 and 24 and also shown in Figures 4 and 6. The tip 192 is provided with an offset portion bent into an inverted U, as shown particularly in Figure 24, which U-shaped portion is tangent to a circle somewhat smaller than the circle of the Bourdon tube itself (as shown in Figure 23). It is into this U-shaped terminal portion that one end of the thermal-compensating element 191 or the outer end of the long thermal-compensating element 211 is secured by soldering or brazing.

In lieu of the lower connector member or Bourdon-anchorage 141 shown in Figures 1 and 2, a modified form of connector or anchorage member shown in Figures 3 to 6, inclusive, and in Figures 21 and 22 may be used. In this form of construction, the fluid connection to the lower end of the Bourdon tube 140 is made by extending the capillary tube (or tubes) 177 directly into the lower end of the Bourdon tube as indicated particularly in Figure 22, adjacent a tip member or anchorage 175. The tube (or tubes) 177 and the anchorage 175 fill the entire opening or inner bore of the Bourdon tube, and are fixed therein by soldering. The anchorage or tip 175 has a portion 176 thereof tangent to the circle of the Bourdon tube. The free end of the tip 175 may then be affixed (by soldering, brazing or the like) to the adjustable sub-base or anchorage-plate 143 shown in Figures 1 and 2, or it may be soldered or brazed to the anchorage member 147 shown in Figures 4 and 6. The anchorage member 147 has a hole 178 therethrough, similar to the hole 146 in anchorage plate 143 (shown in Figures 1 and 2) and is similarly placed and clamped between the base 101 and the post 114 (with or without auxiliary fastening screws 145 as in Figures 1 and 2).

When the yieldable spring-connection is used between the operating end (i.e. the tip 148 or the tip 192) of the Bourdon tube 140 and the output-arm 160, as, for instance, in the embodiments shown and detailed in Figures 3 to 7, inclusive, and in Figures 11 to 13, and 15 to 20, inclusive, then the supplemental anchorage screws 145 may be omitted, because then the stoppage of the output lever 160 (by the levers 194 and 196 and stop-member 134) still permits the operating end of the Bourdon tube to complete its full travel, resisted only by the spring 201 (Figures 18 and 19).

In the embodiments shown in Figures 3 to 6, inclusive, and in Figures 21 and 22, two capillary tubes 177 are shown. One of these capillary tubes 177 is coupled, by the coupling-sleeves 179, to the capillary tube 142 leading to the thermal-bulb assembly at the point of measurement. The other capillary tube 177 is provided for use in the evacuation and filling of the system and in changing or readjusting of its range, or to effect repairs thereon, and is closed off by a closed capping tube or sleeve 180, and is preferably provided with extra length of tubing, coiled in a coil 181, so as to permit the opening and resealing of the system in case of a need for change of range or repair. The other capillary tube, connected through the sleeve 179 to the tube 142, may likewise be provided with an extra length, similarly coiled up, as shown particularly in Figures 3 to 6, inclusive. A clip 182 may be used to hold the sleeves 179 and 180 in place, by means of a screw, as shown in Figures 5 and 6.

In any case assembly is made so that lower end of bearing 151 always slightly clears upper end of post 114.

While in neutral or zero position, one or two longitudinal lines 205 are painted on the turns of Bourdon spring 140 so that motion of the helix can be readily observed in terms of the offset of the successive lines, in case of service questions.

Similar marker lines may be drawn on the springs 140 before evacuation and filling, so that when normally filled, and always when operating, this original line will be in a series of five steps, offset by reason of angular motion from filling or operating pressure. This is a great convenience in rapidly checking the springs 140 to see that they are in operating condition, in cases of process trouble, for otherwise it might be necessary to remove the thermal bulb and go through a rough calibration procedure to determine whether a spring 140 was operative or had lost its filling through corrosion or other failure.

The spring-lever or driving lever 194 (Figure 16) is arranged for either right-hand or left-hand rotation to provide over-travel of either a forward or reverse rotation Bourdon-spring 140. The driven lever 196 and stop members 134 also serve in either clockwise or counterclockwise rotation assemblies. The Bourdon-springs 140 are wound in opposite directions, namely for right or left rotation and the spring tips 148, 175 and 193 which are correspondingly skewed in opposite directions, though they are made from the same blanks but folded in opposite directions.

The present invention may be embodied in other specific forms without departing from the spirit or essential attributes thereof, and it is therefore desired that the present embodiments be considered in all respects as illustrative and not restrictive, reference being had to the appointed claims rather than to the foregoing description to indicate the scope of the invention.

Having thus described the invention, the following is claimed:

1. A Bourdon tube-and-mounting construction including a base, a post secured thereto, a Bourdon tube anchorage adjustably secured to said base, a Bourdon tube spring having one end thereof operatively secured in said anchorage, a stationary bearing-pin carried by said post, a generally elongated tubular bearing-carrying member revolubly mounted on said pin, said tubular member having a bearing of relatively small axial dimension, said tubular member running sufficiently free of said pin to be revoluble thereabout without appreciably contacting said pin but close enough to prevent substantial cocking of said bearing due to any temporary cocking force applied to the tubular member, a driven lever secured to said tubular member, said driven lever having the movable tip of the Bourdon tube affixed thereto and having a stop portion, a stop-supporting member carried by said post, a stop carried by said stop-supporting member, said stop being adjustable in relation to said post and in relation to said driven lever; the point of contact between said stop and the stop portion of said driven lever being in a plane in close proximity to the median plane of the aforesaid bearing normal to its axis.

2. A Bourdon tube-and-mounting construction including a base, a post secured thereto, a Bourdon tube anchorage adjustably secured above said base, a Bourdon tube spring having one end thereof operatively secured in said anchorage, a bearing-pin carried by said post, a generally elongated tubular member revolubly disposed on said pin and having a bearing of relatively short axial dimension, said tubular member running sufficiently free of said pin to run without appreciably contacting said pin but close enough to prevent substantial cocking of said bearing due to any temporary cocking force applied to the tubular member, a driven lever fixed to said tubular member, said driven lever having the movable end of the Bourdon tube affixed thereto and having a stop portion, a stop-supporting member carried by said post, a stop carried by said stop-supporting member on either side of the stop portion of said driven lever, said stops being adjustable in relation to said post and said lever; the point of contact between said stops and the stop portion of said lever being in a plane in close proximity to the median plane of the aforesaid bearing normal to its axis.

3. A Bourdon tube-and-mounting construction in accordance with claim 1 in which the stop portion carried by said lever comprises a stop member extending at an angle thereto.

4. A Bourdon tube-and-mounting construction in accordance with claim 3 in which the stop portion of said lever is positioned at the end of said lever opposite to the point of engagement with the end of the Bourdon tube.

5. A Bourdon tube-and-mounting construction, including a base, a bearing-pin secured thereto, a Bourdon tube having one end thereof operatively secured to said base, a generally elongated member revolubly mounted on said pin and carrying a bearing member revolubly mounted on said pin, said bearing member being of relatively short axial dimension, said elongated member running sufficiently free of said pin so as not appreciably to contact the pin when co-axial therewith but close enough to prevent substantial cocking of said bearing due to any temporary cocking force applied to the elongated member, a driven lever affixed to said bearing member, said driven lever having the movable end of the Bourdon tube affixed thereto and having a stop portion, stop means intermediate said driven lever and said base for limiting the movement of said bearing about said bearing-pin by contact between said stop portion of said driven lever and said stop means, the point of contact of said stop means being in a plane in close proximity to the median plane of the aforesaid bearing member normal to its axis.

6. A Bourdon tube-and-mounting construction, including a base, a Bourdon tube mounted thereon with one end thereof in anchored relation to said base, a pivotal support in operative juxtaposition to the other end of said Bourdon tube and generally co-axial with the convolution thereof, a pivotal driving member pivoted on said pivotal support and extending radially outwardly therefrom and having the other end of said Bourdon tube affixed thereto, a pivotally mounted indicator member adjacent to said pivotal driving member and co-axial therewith, coupling means between said driving member and said indicator member, operative to form a driving contact between said two members when the Bourdon tube is contracting and inoperative with the expansion of the Bourdon tube, and a spring operatively interposed between said pivotal driving member and said pivotal indicator member to cause the latter to be yieldably rotated by the former when the Bourdon tube is expanding, whereby an overtravel of the Bourdon tube in the direction of its expansion-movement can leave the indicator member behind, and an adjustable indicator-stop means common to said pivotal indicator member and said base whereby the movement of the indicator member may be limited while the Bourdon tube over-travels on its expansion phase.

7. A Bourdon tube-and-mounting construction, including a base, a Bourdon tube mounted thereon with one end thereof in anchored relation to said base, a pivotal support in operative juxtaposition to the other end of said Bourdon tube and generally co-axial with the convolution thereof, a pivotal driving member pivoted on said pivotal support and extending radially outwardly therefrom and having the other end of said Bourdon tube affixed thereto, a pivotally mounted indicator member adjacent to said pivotal driving member and co-axial therewith, reversible means operative to interengage said pivotal driving member with said pivotal indicator member when the Bourdon tube is contracting and inoperative with the expansion of the Bourdon tube, and a spring operatively interposed between said pivotal driving member and said pivotal indicator member to cause the latter to be yieldably rotated by the former when the Bourdon tube is expanding, whereby an over-travel of the Bourdon tube in the direction of its expansion-movement can leave the indicator member behind, and a reversible adjustable indicator-stop operatively intervening said pivotal indicator member and said base whereby the movement of the indicator member may be limited while the Bourdon tube over-travels on its expansion phase.

8. A Bourdon tube-and-mounting construction including a base, a Bourdon tube spring having one end thereof anchored in relation to said base, a pivotal tube-anchorage pivotally mounted in operative juxtaposition to the other end of said Bourdon tube spring and co-axially with the convolution thereof and extending radially outwardly from its pivoted end and having the other end of the Bourdon tube affixed to its outer end, the pivotal mounting of said pivotal anchorage member including a bearing of relatively short axial dimension and a relatively long non-journalled anti-cocking element extending axially from said bearing a substantial distance, said bearing being in a plane in close proximity to the plane of attachment of the movable end of the Bourdon tube to its pivotal anchorage member.

9. A Bourdon tube-and-mounting construction including a base, a Bourdon tube having one end thereof anchored in relation to said base, a pivotal tube-anchorage pivotally mounted in operative juxtaposition to the other end of said Bourdon tube and co-axially with the convolution thereof and extending radially outwardly from its pivot and having the other end of the Bourdon tube affixed to the outer end thereof, the pivotal mounting of said pivotal anchorage member including a bearing of relatively short axial dimension and a relatively long anti-cocking element extending axially from said bearing a substantial distance, said bearing having its median plane normal to the pivotal axis and in close proximity to the median plane of the attachment of the movable end of the Bourdon tube to its pivotal anchorage member, a pivotally mounted indicator member generally adjacent to said pivotal anchorage member and having its axis of pivotation co-axial with that of said pivotal anchorage member, stop-means intermediate the pivotal anchorage member and the pivotal indicator member for limiting the travel of said indicator member, said stop means being operative in the direction of the contraction and inoperative in the direction of the expansion of said Bourdon tube, and a spring operatively interposed between said two pivotal members in the direction of the expansion of said Bourdon tube, whereby the expansion of the Bourdon tube will yieldably deflect the indicator member.

10. A Bourdon tube-and-mounting construction including a base, a Bourdon tube having one end thereof anchored in relation to said base, a pivotal tube-anchorage pivotally mounted in operative juxtaposition to the other end of said Bourdon tube and co-axially with the convolution thereof and extending radially outwardly from its pivot and having the other end of the Bourdon tube affixed thereto, the pivotal mounting of said pivotal anchorage member including a bearing of relatively short axial dimension and a relatively long anti-cocking element extending axially from said bearing a substantial distance, said bearing having its median plane normal to the pivotal axis and in close proximity to the median plane of the attachment of the movable end of the Bourdon tube to its pivotal anchorage member, a pivotally mounted indicator member generally adjacent to said pivotal anchorage member and having its axis of pivotation co-axial with that of said pivotal anchorage member, reversible stop-means operatively interposed between the pivotal anchorage member and the pivotal indicator member for limiting the travel of said indicator member, said stop means being operative in the direction of the contraction and inoperative in the direction of the expansion of said Bourdon tube, and a spring operatively interposed between said two pivotal members in the direction of the expansion of said Bourdon tube, whereby the expansion of the Bourdon tube will yieldably deflect the indicator member.

11. A Bourdon tube including a plurality of convolutions, marker-lines on said convolutions in alignment with each other when the Bourdon tube is at some predetermined pressure, thereby providing a visual indication of said pressure by the alignment of said marker-lines and a visual indication of deviation from said pressure by the lack of alignment of said marker-lines.

12. A Bourdon tube including a plurality of convolutions, marker-lines on said convolutions, said marker-lines forming a more or less continuous line when the Bourdon tube is without internal pressure, thereby providing a visual indication of the presence of pressure within the Bourdon tube by the lack of alignment of said marker-lines.

13. A Bourdon tube-and-mounting construction including a base, a post secured thereto, a Bourdon tube anchorage adjustably secured above said base, a Bourdon tube spring having one end thereof operatively secured in said anchorage, a stationary bearing-pin carried by and extending from the end of said post generally in coaxial relation to the convolution of said Bourdon tube spring and with one end of said pin fixed on said post, a generally elongated tubular member revolubly mounted on said bearing-pin on top of said post and having a bearing of relatively short axial dimension in the end thereof nearest said post and disposed in close proximity to the fixed end of said pin, said tubular member running sufficiently free of said pin to run without appreciably contacting said pin but close enough to prevent substantial cocking of said bearing due to any temporary cocking force applied to the tubular member, a driven lever fixed to said tubular member, said driven lever having the movable tip of the Bourdon tube affixed thereto and having a stop portion, a stop-supporting member carried by said post, a stop carried by said stop-supporting member adjustable in relation to said post and in relation to said lever.

References Cited in the file of this patent

UNITED STATES PATENTS

| | | |
|---|---|---|
| 980,403 | Blanchard et al. | Jan. 3, 1911 |
| 1,857,139 | Carlton | May 10, 1932 |
| 1,865,082 | Chrisman | June 28, 1932 |
| 1,982,300 | Harrison | Nov. 27, 1934 |
| 2,008,970 | Spitzglass | July 23, 1935 |
| 2,203,057 | Moore | June 4, 1940 |
| 2,223,579 | Ruopp | Dec. 3, 1940 |
| 2,406,098 | Musgrave et al. | Aug. 20, 1946 |

FOREIGN PATENTS

| | | |
|---|---|---|
| 681,521 | France | Feb. 3, 1930 |